G. RESTUCCI.
STEAM CONTROLLING DEVICE.
APPLICATION FILED MAR. 19, 1909.
957,097.
Patented May 3, 1910.
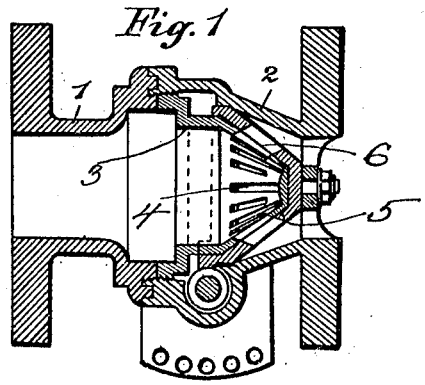
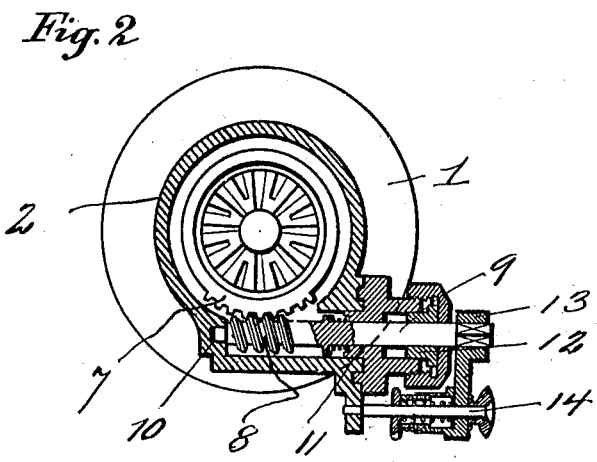
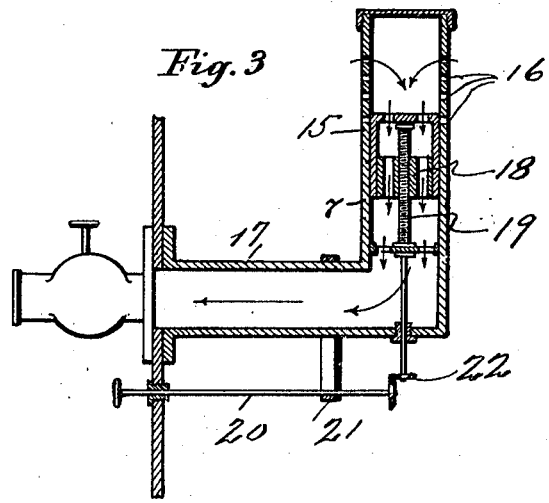
WITNESSES
W. P. Burke
Edward Spring
INVENTOR
Giuseppe Restucci
BY
Johnson
ATTY.

UNITED STATES PATENT OFFICE.

GIUSEPPE RESTUCCI, OF NAPLES, ITALY.

STEAM-CONTROLLING DEVICE.

957,097. Specification of Letters Patent. Patented May 3, 1910.

Application filed March 19, 1909. Serial No. 484,441.

*To all whom it may concern:*

Be it known that I, GIUSEPPE RESTUCCI, a subject of the King of Italy, residing at Naples, Italy, mechanical engineer, have invented certain new and useful Improvements in Steam - Controlling Devices, of which the following is a specification.

The invention relates to devices for controlling the steam supplied to cylinders of engines; and it consists of the novel construction and arrangement of the several parts, and their combination, as will be hereinafter fully described, and particularly stated in the claims.

The chief object of the invention is to provide a steam-controlling device, directly interposed between the supply and distributing devices, by means of which the steam is dried on its passage therethrough, so that a highly dried, superheated steam, not cooled by intermediate elements, may be supplied to the cylinders of an engine, resulting in an improved operation of the latter, besides economy in fuel and feed-water, the small difference of pressure between the generator and engine, which pressure is due to the controlled passage of the steam, being balanced by its greater speed, due to its being thoroughly dried on its passage through the steam-controlling device.

In the drawings: Figure 1 is a longitudinal section of my improved device; Fig. 2 is a face view of the same; showing the mechanism for operating the valve in section, and Fig. 3 is a modified form of the device.

Referring to Figs. 1 and 2, the numerals 1 and 2 indicate respectively two sections of a suitable valve casing, coupled together in any well-known manner. Located within the section 2 is a conical shell 3 provided with radial slots 4, and mounted on said shell is a correspondingly shaped rotary-valve 5, also provided with radial slots 6 adapted to register with the slots in the shell. The valve has formed on its periphery a section of gear-teeth 7 in mesh with a worm 8, formed on a shaft 9, which is journaled in suitable bearings 10 and 11. The shaft is provided with a suitable stuffing-box 12, and has keyed on its outer end an arm 13 provided with a spring-pressed locking-rod 14, adapted to lock the shaft, and thereby the valve, against rotation, so as to regulate the area of the openings in the valve and shell, and thereby control the passage of the steam.

The passage of the steam through the controlling-device, which, as heretofore stated, is located between the supply and distributing-pipes, (not shown), is regulated by the valve 5, the pressure of the steam being reduced, by friction, in passing through the openings or passages in the valve, and its shell, the width of the openings being regulated by the worm-gear, which is operated by the arm 13 upon the withdrawal of the locking-rod. The steam is also dried and superheated by its frictional passage through the valve, and is thus delivered to the distributing-pipe.

In the modification shown in Fig. 3, the numeral 15 indicates a steam supply-pipe provided with a plurality of passages or ports 16, said pipe being closed at one end and having a delivery pipe 17 at the other end. Operative in the supply-pipe is a perforated piston 18, adapted to be operated to close or partially close the passages or ports 16. The piston is provided with a screw-threaded rod 19, operated by a suitable shaft 20, through the medium of bevel gears 21 and 22, so that by manipulating the shaft 20, the piston may be raised to cover or partially cover the ports 16, or lowered to uncover them. The steam passing through said ports is throttled by the operation of the piston, and passing through the passages or channels in said piston is dried, superheated and passed directly to the main or distributing-pipe.

Having thus fully described my invention, what I claim is:

1. A device for throttling, drying and superheating steam, comprising a member provided with passages and means for regulating the area of said passages, said member being interposed between the steam supply and distributing means.

2. A device for throttling, drying and superheating steam, comprising a member provided with passages, means for regulating the area of said passages, and means for holding said area-regulating means at a fixed position.

3. A device for throttling, drying and superheating steam comprising a sectional casing, a fixed slotted shell, a correspondingly slotted valve mounted on said shell, and means for rotating said valve to diminish the area of the slots in the shell.

4. A device for throttling, drying and superheating steam, comprising a sectional casing, a fixed shell provided with openings therethrough, a rotatable valve, provided with correspondingly shaped openings, mounted on said shell, said valve being provided with gear-teeth, and a worm-shaft arranged to operate said valve to regulate the area of the openings in the shell.

5. A device for throttling, drying and superheating steam, having in combination, a sectional casing, a fixed shell provided with openings therethrough, a rotatable valve, provided with correspondingly shaped openings, mounted in said shell, said valve being provided with gear-teeth, a worm-shaft, and means for rotating said shaft to operate the valve, whereby the area of the openings in the shell may be regulated.

In testimony whereof I have affixed my signature in presence of two witnesses.

GIUSEPPE RESTUCCI.

Witnesses:
VINCENZE LOURY,
FRANCESCO SAOLO.